(12) United States Patent
Doerksen et al.

(10) Patent No.: US 7,534,326 B1
(45) Date of Patent: May 19, 2009

(54) COKE DRUM BOTTOM UNHEADING SYSTEM

(75) Inventors: Brian J. Doerksen, Ponca City, OK (US); Vance C. Green, Ponca City, OK (US); Jinyang James Lu, Sugar Land, TX (US); Charles Schroeder, Humble, TX (US); Meir Snir, Long Beach, CA (US); Mohamad T. Ali, Arcadia, CA (US)

(73) Assignee: ConocoPhillips Company, Houston, TX (US)

( * ) Notice: Subject to any disclaimer, the term of this patent is extended or adjusted under 35 U.S.C. 154(b) by 451 days.

(21) Appl. No.: 11/215,006

(22) Filed: Aug. 29, 2005

Related U.S. Application Data

(60) Provisional application No. 60/614,313, filed on Sep. 29, 2004.

(51) Int. Cl.
   *C10B 33/00* (2006.01)
   *B01D 3/00* (2006.01)

(52) U.S. Cl. .............. 201/3; 201/4; 202/239; 202/242; 202/252; 202/262; 208/131

(58) Field of Classification Search .......... 202/239, 202/242, 252, 262; 208/131; 196/132, 137; 201/3, 4
   See application file for complete search history.

(56) References Cited

U.S. PATENT DOCUMENTS

| | | | |
|---|---|---|---|
| 4,960,358 A * | 10/1990 | DiGiacomo et al. ...... 414/684.3 | |
| 5,294,157 A | 3/1994 | Smith et al. | |
| 5,876,568 A * | 3/1999 | Kindersley ............. 202/242 |
| 6,022,454 A * | 2/2000 | Fetzer .................. 202/242 |
| 6,039,844 A | 3/2000 | Malik |
| 6,066,237 A | 5/2000 | Kindersley |
| 6,423,188 B1 | 7/2002 | Fetzer |
| 6,565,714 B2 | 5/2003 | Lah |
| 6,660,131 B2 | 12/2003 | Lah |
| 6,751,852 B2 | 6/2004 | Malsbury et al. |
| 6,808,602 B2 | 10/2004 | Schonfeld et al. |
| 6,843,889 B2 | 1/2005 | Lah et al. |
| 2002/0020619 A1 * | 2/2002 | Fetzer .................. 202/242 |
| 2002/0175065 A1 | 11/2002 | Malsbury |
| 2003/0089589 A1 | 5/2003 | Malsbury |

(Continued)

OTHER PUBLICATIONS

PCT Search Report for International Application No. PCT/US05/32707.

(Continued)

*Primary Examiner*—N. Bhat

(57) ABSTRACT

Clamping system and method for clamping the bottom head cover of a coke drum to the bottom flange thereof are disclosed. The system and method include determining the flange stiffness or resistance to deflection resulting from the spring-like force exerted on the bottom head cover and bottom flange gasket seating surface by the gasket in its compressed state. This deflection information may then be used to estimate the minimum number of clamps needed to ensure sufficient load remains on the gasket at the midpoints between the clamps to effectively keep the gasket sealed. An appropriate number of clamps may then be disposed around the periphery of the bottom flange to clamp it to the bottom head cover. In one practical design, each clamp engages a lug attached to the periphery of the bottom head cover such that the clamp does not extend underneath the bottom head cover when clamped.

28 Claims, 3 Drawing Sheets

U.S. PATENT DOCUMENTS

2003/0127314 A1* 7/2003 Bell et al. .................. 202/262
2004/0065537 A1   4/2004 Lah
2004/0118746 A1* 6/2004 Wilborn et al. ............. 208/131

OTHER PUBLICATIONS

PCT Written Opinion for International Application No. PCT/US05/32707.

* cited by examiner

COKE DRUM BOTTOM UNHEADING SYSTEM

CROSS-REFERENCE TO RELATED APPLICATION

This application claims the benefit of U.S. Provisional Patent Application Ser. No. 60/614,313 filed Sep. 29, 2004.

FIELD OF THE INVENTION

The present invention relates to an improved system and method for use in unheading coke drums.

BACKGROUND OF THE INVENTION

In the hydrocarbon processing industry, it is common to recover valuable products from the heavy residual oil that remains after refining operations are completed. This recovery process produces a byproduct called coke and is called coking. The coking process is performed in large vessels with top and bottom head covers called coke drums. The bottom head covers are typically circular steel plates that are often 6 feet in diameter and bolted onto a flange at the bottom of the coke drum. The top head covers are similar, but often 36 inches in diameter. A gasket, such as a double-soft iron-jacketed non-asbestos filled gasket, is placed between the coke drum top and bottom flanges and top and bottom head covers to help provide a vapor-tight seal for the coke drum. Typically, these flanges and covers are designed by the rules of American Society of Mechanical Engineers Sect. VIII Div 1, Appendix II, or other vessel code.

During the coking process, the drums are subjected to high temperatures (typically 900 to 930 degrees Fahrenheit at the inlet) and pressures (typically 15 to 50 psig overhead pressure). Thus, the coke drums have to be steam purged and cooled with quench water prior to removal of the coke. After the drums are vented to atmosphere and quench water is drained, the top and bottom head covers are unbolted and removed or "unheaded." Due to the hazard of hot water and coke fallout, there are risks associated with workers manually removing the head covers. At some sites, head removal is done automatically by costly and complicated, fully remotely actuated equipment. However, most cokers are still outfitted with either fully manual systems where the bottom head covers are removed by carts or trolleys, or hydraulically actuated systems that swing the head covers out of the way. These more common systems still require the bolts on the head covers to be manually loosened and removed. The typical procedure is to have the bottom head handling device push up against the bottom head cover to the coke drum while workers using air wrenches loosen up to 70 or more bolts per head cover. Then, after the bolts have been loosened, the bottom head cover may be actuated remotely to remove it from the coke drum using automated equipment.

While the bolts are being loosened, however, extremely hot (e.g., 400 degrees Fahrenheit or higher) water, steam and coke may escape if the seal between the bottom head cover and the coke drum is not maintained. The hot water and steam escaping under pressure may cause serious burns and other injuries to the workers loosening the bolts. Consequently, care must be taken when removing the bolts to make sure that the seal of the coke drum is not compromised.

A number of coke drum bottom unheading systems exist. For example, U.S. Pat. Nos. 5,876,568 and 6,066,237 use a specially designed clamp to hold the bottom head cover against the drum flange. The drum flange has a tapered top and the clamp is in the form of a ring that has been cut into two or more equal segments around the diameter. As clamping force is applied tangentially to the outside of the ring clamp segments, movement of the clamp up the tapering at the top of the bottom flange tightens the clamp and provides the additional pressure needed to hold the bottom head to the drum.

Another system that uses clamps to support the bottom head cover during unheading is described in U.S. Published Patent Application No. 20020157936. This system employs a cart having vertical supports for four or more clamps that can be rotated around the vertical supports. The clamps are applied after removing one-half of the head cover bolts (every other bolt), and hydraulic pressure is then used to hold the bottom head cover in place while the remaining bolts are removed.

These and other existing unheading systems, however, tend to be mechanically complex and/or very expensive (e.g., $1 million per coke drum). Moreover, the semi-manual systems known to be available commercially today provide insufficient clamping force to reliably maintain the gasket load between the head covers and the coke drum all the way around the perimeter. Accordingly, what is needed is a coke drum clamping system and method that is mechanically simple, reliable, and relatively inexpensive, and that provides protection for workers removing the bolts against the risk of hot vapor and/or water hazards associated with the work.

SUMMARY OF THE INVENTION

The present invention is directed to a method and system of clamping the bottom head cover of a coke drum for use in unheading operations to provide added safety to workers removing the bolts. The invention preferably involves determining the flange stiffness or resistance to deflection resulting from the spring-like force exerted on the bottom head cover and bottom flange gasket seating surface by the gasket in its compressed state. This deflection information may then be used to estimate the minimum number of clamps needed to ensure sufficient load remains on the gasket at the midpoints between the clamps to effectively keep the gasket sealed. An appropriate number of clamps may then be disposed around the periphery of the bottom flange to clamp it to the bottom head cover.

One practical design of the clamp provides a first arm that may be attached to the periphery of the bottom flange and a second arm that is pivotable about the first arm. The second arm engages a lug attached to the periphery of the bottom head cover such that the clamp does not extend underneath the bottom head cover when clamped. A benefit of this design is that it allows unencumbered access to the working area beneath the coke drum for activities such as removing the bolts in the bottom head cover. An adjustable clamping mechanism allows the clamp to be selectively opened and then closed with a desired amount of clamping force.

In one aspect, the invention is directed to a method of clamping a bottom head cover of a coke drum to a bottom flange of the coke drum. The method comprises the step of determining a minimum number of clamps needed to maintain an effective seal between the bottom head cover and the bottom flange of the coke drum. The method further comprises the step of mounting at least the minimum number of clamps around a periphery of the bottom flange to secure the clamps to the coke drum. The mounted clamps are then actuated from a remote location to clamp the bottom head cover to the bottom flange.

In another aspect, the invention is directed to a clamping system for clamping a bottom head cover of a coke drum to a bottom flange of the coke drum. The system comprises a predetermined number of clamps attached to the bottom flange, and a control unit for remotely actuating the clamps at approximately the same time to apply approximately the same amount of clamping force. The clamps are spaced apart by no more than a maximum distance that is determined based on one or more of a diameter and geometry of the bottom flange, a stiffness of the bottom flange, a resiliency and response under varying load of a gasket disposed between the bottom flange and the bottom head cover, and a pressure exerted on the bottom head cover from liquid inside the coke drum.

In still another aspect, the invention is directed to an apparatus for clamping a bottom head cover of a coke drum to a bottom flange of the coke drum. The apparatus comprises a first clamp member having a distal end and a proximal end, the proximal end of the first clamp member configured to be anchored to the bottom flange. The apparatus further comprises a second clamp member having a distal end and a proximal end, the proximal end of the second clamp member capable of engaging a lug extending from an outer circumference of the bottom head cover, the first and second clamp members pivotably connected at a point between their respective distal ends and proximal ends. A clamping mechanism is configured to apply a force to the distal ends of the first and second clamp members to cause the proximal end of the second clamp member to engage the lugs.

BRIEF DESCRIPTION OF THE DRAWINGS

The foregoing and other aspects of the invention will become apparent from the following detailed description and upon reference to the drawings, wherein.

DESCRIPTION OF ILLUSTRATIVE
EMBODIMENTS OF THE INVENTION

Following is a detailed description of exemplary embodiments of the invention with reference to the drawings wherein the same reference labels are used for the same or similar elements. It should be noted that the drawings are provided for illustrative purposes only and are not intended to be a blueprint or drawn to any particular scale.

As mentioned above, embodiments of the invention provide a method and system for clamping a bottom head cover to a coke drum for use in unheading operations. The method and system include two main parts: 1) use of multiple individual clamps mounted around the perimeter of the bottom flange of the coke drum, and 2) a design methodology that can determine the minimum number of clamps and/or the maximum spacing between clamps that will provide the desired degree of gasket load. The desired degree of gasket load, as used herein, is the amount of gasket load that will maintain effective sealing of the gasket in the area between the clamps for a given coke drum so that there is a substantially solids, gas and liquid tight seal, i.e. there is little or no coke, gas, or liquid escaping from the coke drum.

Figure 1:
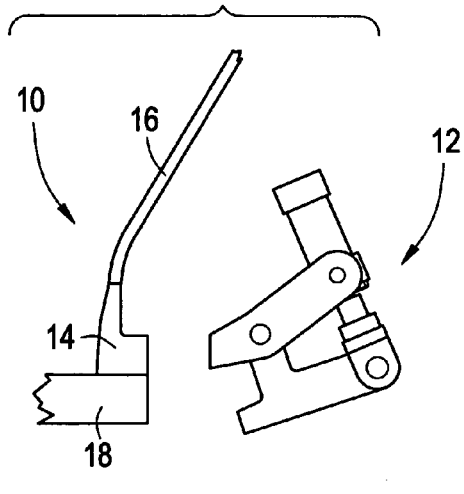
FIG. 1 illustrates a clamp according to embodiments of the invention.

FIG. 1 illustrates a coke drum 10 and an exemplary clamp 12 implemented according to embodiments of the invention. For economy of the drawings, only a portion of the coke drum 10 is shown here. The coke drum 10 has a bottom flange 14, a drum wall 16 attached to the bottom flange 14, and a bottom head cover 18 bolted to the bottom flange 14. A predetermined number of the clamps 12 may then be placed along the circumference of the bottom flange 14 to clamp the bottom head cover 18 to the coke drum 10 (see FIGS. 5-6). In this way, the seal between the bottom flange 14 and the bottom cover head 18 may be maintained while workers manually loosen the bolts in the bottom head cover 18.

In one embodiment, the number of clamps 12 and/or the distance between individual clamps 12 that will provide a sufficient gasket load to maintain the seal between the bottom head cover 18 and the bottom flange 14 at all points around the circumference may be determined based on one or more of the following factors: 1) flange diameter, 2) flange stiffness, 3) gasket resiliency or response to the changing load as the bolts are removed, and 4) the pressure exerted on the bottom head cover 18 from the liquid inside the coke drum 10. Preferably, all four factors are used to determine the minimum number of clamps 12 and/or the maximum distance between individual clamps 12 needed, but any one of the four factors may be used separately to make the determination. For example, the first factor, flange diameter, may be used alone on a trial and error basis to determine the minimum number of clamps 12 and/or the maximum distance between clamps 12. Those of ordinary skill in the art will also recognize that any one of the four factors may be used in combination with any other one or more of the four factors to determine the minimum number of clamps 12 and/or the maximum distance between clamps 12.

To illustrate, deflection of the bottom flange 14 and bottom head cover 18 occurs in the area in between the clamps 12. The deflection is caused by the spring-like force exerted by the gasket as a result of being in a compressed state. The spring-like force varies from the clamp to the midpoint between clamps, which means that the gasket load is lower at the midpoint between the clamps 12 than where the clamping force is applied. If the gasket load becomes too small, then the seal between the bottom head cover 18 and the bottom flange 14 may be breached. By using a sufficient number of clamps to apply an effective amount of clamping force around the bottom flange 14, an adequate gasket load may be maintained all the way around the bottom flange 14.

A preferred design method, then, is to determine the spring-like force exerted on the bottom head cover 18 and bottom flange's gasket seating surface, and the resultant deflection of the bottom flange 14 and the bottom head cover 18 that allows the gasket to be partially unloaded and relaxed at points between the clamps 12. The method involves determining the flange stiffness or resistance to deflection and using that information to estimate the minimum number of clamps 12 needed to ensure that sufficient load remains on the gasket at the midpoint between the clamps 12 to keep the gasket effectively sealed.

One way to determine the spring-like force is to calculate it iteratively and using finite element analysis. Published information exists that allows determination of appropriate gasket "spring factor" and determining the necessary load midpoint between the clamps 12 to provide sufficient gasket sealing. One of the sources for this information is the "Tightness Parameter Method" data published by the Pressure Vessel Research Council. The information may then be used to determine the minimum number of clamps 12 needed to maintain sufficient gasket load all the way around the bottom flange 14.

Other techniques may also be used for determining the minimum number of clamps 12 without departing from the scope of the invention. For example, it is possible to determine the minimum number of clamps 12 by trial and error. Regardless of which technique is used, once the number of clamps 12 is determined, at least that number may then be applied to other coke drums 10 that have a similar size and geometry.

The following assumes the minimum number of clamps 12 has already been determined. In one exemplary procedure, the clamps 12 are mounted around the periphery of the bottom flange 14. A head handling cart or trolley is placed underneath the bottom head cover, and a hydraulic cylinder or other lifting device is extended from the cart or trolley to the head cover. The clamps 12 are then closed, usually from a remote location, to provide the desired clamping force based on the given coke drum. Workers remove the bolts in the bottom head cover and then retreat to a safe location to remotely open the clamps 12 and lower the bottom head cover to the cart or trolley. The cart or trolley is then moved out from underneath the drum. Such a procedure may be used in conjunction with currently available devices such as devices used for first break of the inlet line (e.g., a flange available from Grayloc Products Engineering of Houston, Tex. which is located on the inlet line and which can be remotely opened after the coke drum has been quenched and drained to disconnect the bottom head of the coke drum from the inlet line) and remotely actuated hydraulic telescopic devices used to join the fixed chute (an apparatus that provides a circular wall attached to the bottom flange of the coke drum extending to the corresponding hole in the switch deck, i.e., the floor beneath the coke drum, for purposes of containment of coke once the process of drilling the coke from the drum begins) to the coke drum flange prior to removal of coke from the chamber.

In general, the clamps 12 may be any suitable, remotely actuated clamps. In one exemplary embodiment, the clamps 12 are designed so that they do not extend underneath, or even below, the bottom head cover 18 when fully engaged. This allows unimpeded access to the area directly beneath the bottom surface of the coke drum for operating head handling devices, access to remove bolts, and other equipment.

Figure 2:
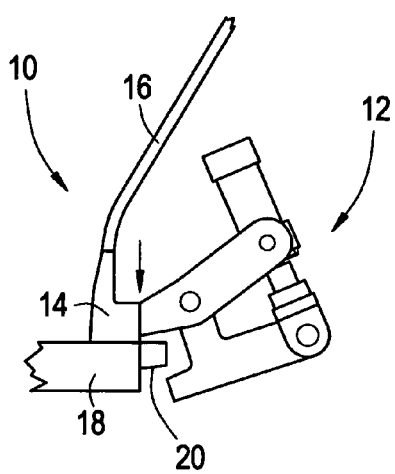
FIG. 2 illustrates the clamp of FIG. 1 attached to a coke drum.

FIG. 2 shows the exemplary clamp 12 of FIG. 1 in a half-opened position and attached to the bottom flange 14 of the coke drum 10. The attachment (indicated by the arrow) may be accomplished by welding the clamp 12 to the outer circumference of the bottom flange 14. The clamp 12 may also be attached to the annular seat (left of the arrow) formed by the exposed top surface of the bottom flange 14. Either way, the clamp 12 is expected to remain permanently attached to the coke drum 10 in these embodiments. In other embodiments, however, the clamp 12 may instead be releasably attached to the coke drum 10 using, for example, bolts, rivets, various types of joints, and other releasable connections (see FIG. 7). The releasable attachment allows the clamp 12 to be removed from the coke drum 10 as needed for maintenance and repair of the clamp 12.

A lug 20 is attached (e.g., welded) to the outer circumference of the bottom head cover 18 directly underneath the point where the clamp 12 is attached to the bottom flange 14. It is also possible for the lug 20 to be formed as a part of the bottom head cover 18 instead of being attached thereto. The lug 20 may be made of steel or other suitable material and has a thickness that is preferably less than, but may be equal to, the thickness of the bottom head cover 18. Such a lug 20 provides an engagement point for the clamp 12 so that when it is closed on the lug 20, the clamp 12 does not extend underneath the bottom head cover 18. In some embodiments, the lug 20 may have a thickness such that, when closed, the clamp 12 does not even extend below the bottom head cover 18, although this is not necessary to the practice of the invention. In either case, the clamp 12 is designed so that it interferes very little or not at all with any activity taking place directly beneath the coke drum 10, such as the removal of bolts.

Figure 3:
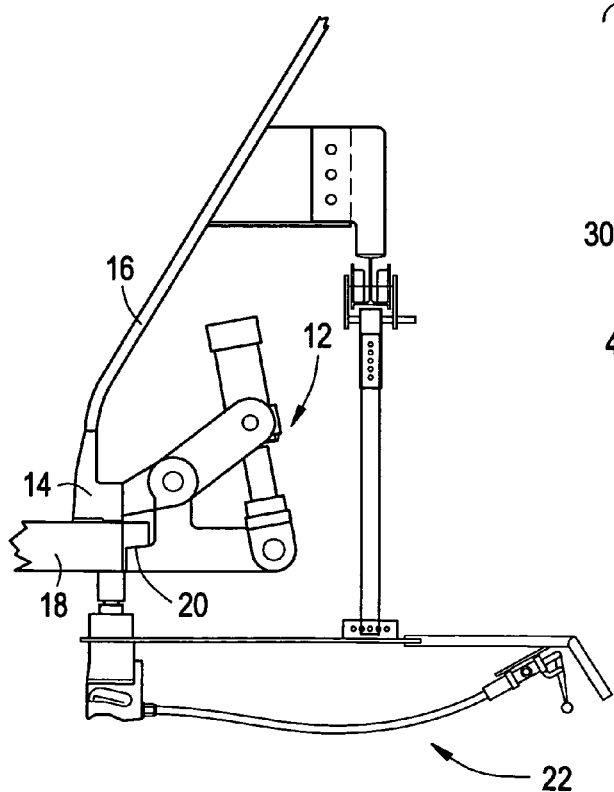
FIG. 3 illustrates the use of an air wrench in conjunction with the clamp of FIG. 1.

The unimpeded access is especially important for operations where an air wrench 22 is used to unbolt the bottom head cover 18 because the air wrench 22 is usually mounted on a trolley that is rolled around under the drum 10 by the workers. This is illustrated in FIG. 3, where the clamp 12 is shown in a fully closed position and the air wrench 22 being used to loosen the bolts of the bottom head cover 18.

Figure 4:
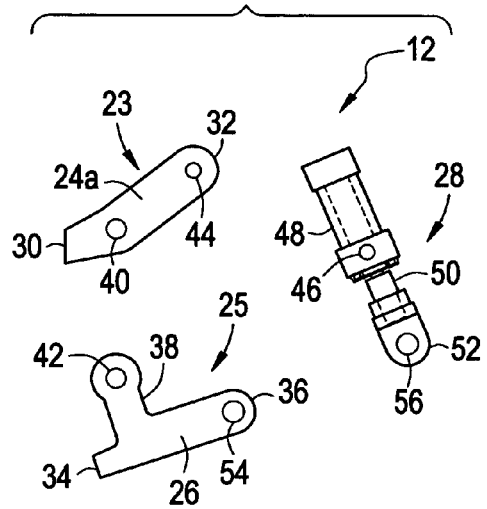
FIG. 4 illustrates the components of the clamp of FIG. 1.

FIG. 4 illustrates the various components of the clamp 12, including a fixed clamp member 23, a movable clamp member 25, and an adjustable clamping mechanism 28 connected to both the fixed clamp member 23 and the movable clamp member 25. All of the components are preferably made of a suitable material, such as steel.

In one embodiment, the fixed clamp member 23 includes two parallel fixed arms 24a and 24b (only one shown here) and the movable clamp member 25 includes a single movable arm 26 mounted between the fixed arms 24a and 24b. This embodiment is the one shown thus far in FIGS. 1-4. In other embodiments, however, the arm configuration may be reversed in that the fixed clamp member 23 may include a single fixed arm and the movable clamp member 25 may include two adjacent movable arms. It is also possible to employ one arm each for both the fixed clamp member 23 and the movable clamp member 25, although the stability of the clamp 12 may be lessened in such an embodiment. Further, although a specific shape and configuration are shown here for each component, it should be clear to those having ordinary skill in the art that other shapes and configurations may certainly be used. For economy of the description, only the configuration shown in FIGS. 1-4 will be described below.

Each fixed arm 24a and 24b has a proximal end 30 for attachment to the bottom flange 14 of the coke drum 10 and a distal end 32 for connection to the adjustable clamping mechanism 28. Similarly, the movable arm 26 has a proximal end 34 for engaging the bottom head cover 18 (i.e., via the lug 20 attached thereto) and a distal end 36 for connection to the adjustable clamping mechanism 28. The movable arm 26 further includes a pivot portion 38 extending in a substantially normal direction from a point on the movable arm 26 between the proximal end 34 and the distal end 36 for connection to the fixed arms 24a and 24b. Openings 40 near the proximal ends 30 of both fixed arms 24a and 24b and a corresponding opening 42 in the pivot portion 38 of the movable arm 26 allow the arms 24a, 24b, and 26 to be pivotably connected via, for example, a pin (not shown) inserted through the openings 40 and 42. Similarly, openings 44 near the distal ends in both fixed arms 24a and 24b and a corresponding opening 46 in the adjustable clamping mechanism 28 allow these two components to be pivotably connected via another pin (not shown).

The adjustable clamping mechanism 28 in this embodiment includes a bore cylinder 48 having a rod 50 disposed therein and a hinge member 52 connected to one end of the rod 50. An opening 56 in the hinge member 52 and a corresponding opening 54 in the distal end of the movable arm 26 allow the hinge member 52 and the movable arm 26 to be hingedly connected via, for example, yet another pin (not shown) inserted through the openings 54 and 56. The bore cylinder 48 preferably provides sufficient stroke (dashed lines) and the rod 50 preferably has sufficient length to drive the movable arm 26 so that the clamp 12 may alternate between a fully closed and a fully opened position for a given size lug 20.

In one embodiment, the bore cylinder 48 is a hydraulic cylinder where fluid from a hydraulic power pack (not shown) may be remotely actuated by a suitable control unit (also not shown) to drive the rod 50 in and out of the bore cylinder 48. Such a hydraulic power pack and the remote control unit therefor are known to those having ordinary skill in the art and will not be described here. Preferably, all clamps 12 are connected to the same remotely actuated hydraulic power pack so that they may be engaged at substantially the same time and with substantially the same amount of force.

An advantage of the adjustable clamping mechanism 28 is that it allows the amount of clamping force applied to bottom flange 14 to be varied to meet the needs of a particular application. Other types of clamping mechanisms may also be used without departing from the scope of invention, including screw actuators, or even non-adjustable clamping mechanisms that apply substantially the same amount of clamping force every time.

Figure 5:
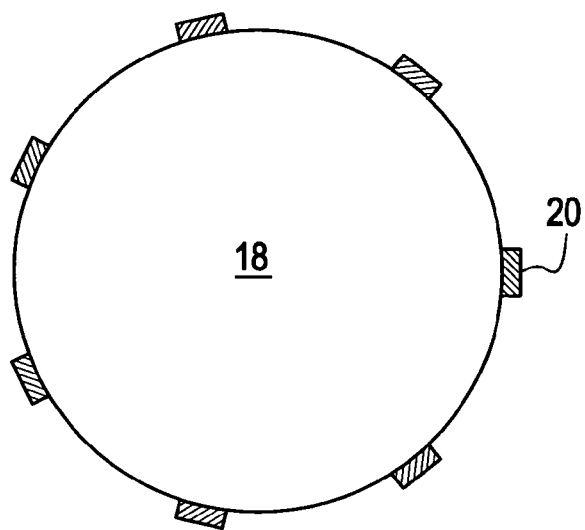
FIGS. 5-6 illustrate a clamping system according to embodiments of the invention where the clamps are permanently attached to the bottom flange.
Figure 6:
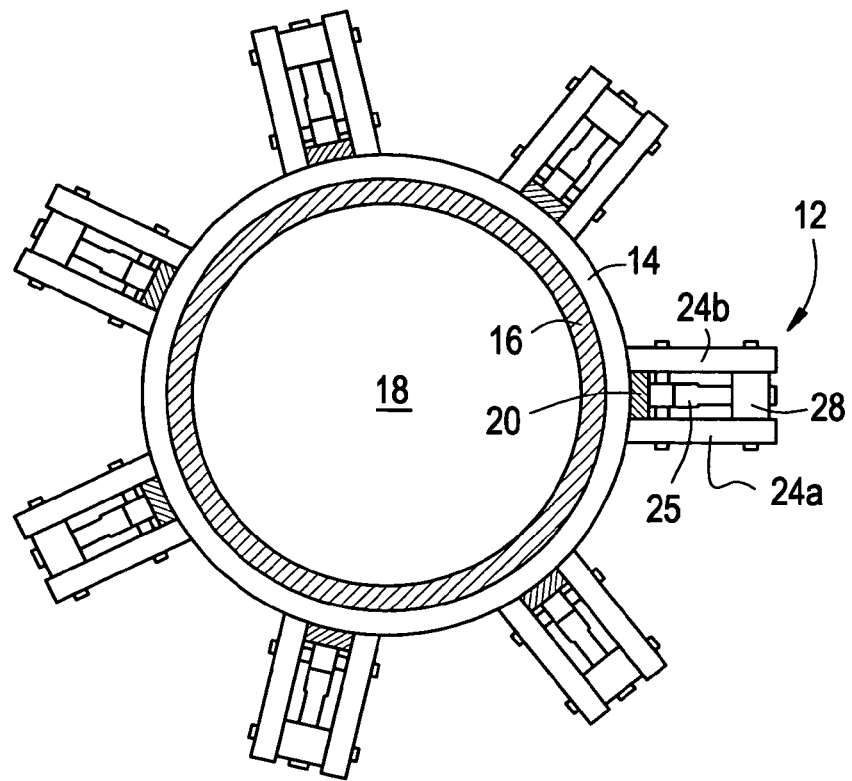

FIGS. 5-6 illustrate a bottom view and a top view, respectively, of the coke drum clamping system according to embodiments of invention. As can be gleaned from FIG. 5, it has been determined that seven clamps 12 are needed in this particular coke drum setup, preferably spaced evenly apart. Accordingly, seven lugs 20 are attached (e.g., welded) to the bottom head cover 18 for receiving a corresponding number of clamps 12. It is possible, of course, to have more lugs 20 than clamps 12 or vice versa so that one or the other remains unused, but a one-to-one ratio is more typical. The clamps 12 are then attached (e.g., welded) to the bottom flange 14 of the coke drum 10 directly over the lugs 20, as shown in FIG. 6.

Figure 7:
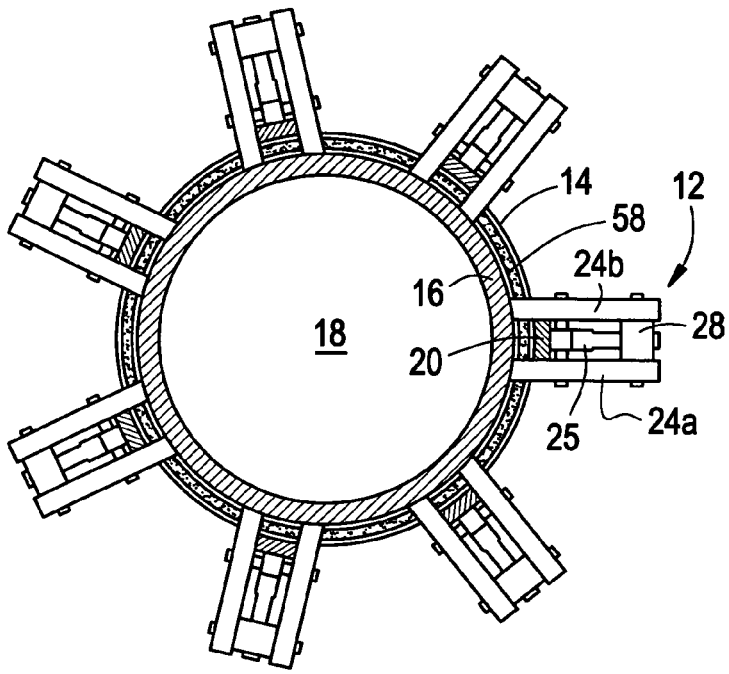
FIG. 7 illustrates another clamping system according to embodiments of the invention where the clamps are releasably attached to the bottom flange.

FIG. 7 illustrates an embodiment of the invention where, instead of the clamps being welded to the bottom flange 14, the clamps 12 are releasably mounted on the bottom flange 14. Here, the clamps 12 are simply held or pressed to the bottom flange 14 via a split ring 58. The split ring 58 is looped through holes (not visible here) in the proximal ends of the fixed arms 24a and 24b, then assembled around the drum wall 16 on the exposed top surface of the bottom flange 14. Thus, the fixed arms 24a and 24b in this embodiment need to be long enough so that their proximal ends extend over the exposed top surface of the bottom flange 14 and preferably abut the drum wall 16. The clamps 12 may then be actuated to engage the top surface of the bottom flange 14 and the lugs 20 to thereby clamp the bottom head cover 18 to the bottom flange 14. To remove the clamps 12, simply disassemble the split ring 58 and slide the pieces out from the holes in the proximal ends of the fixed arms 24a and 24b.

Figure 8:
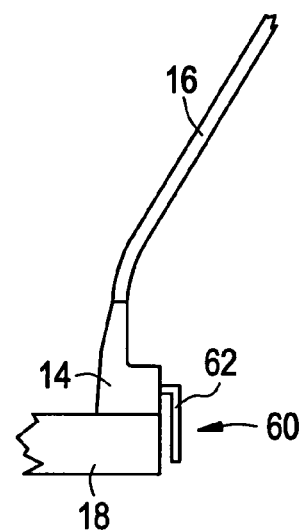
FIGS. 8-9 illustrate still another clamping system according to embodiments of the invention where a skirt is provided around the bottom flange.
Figure 9:
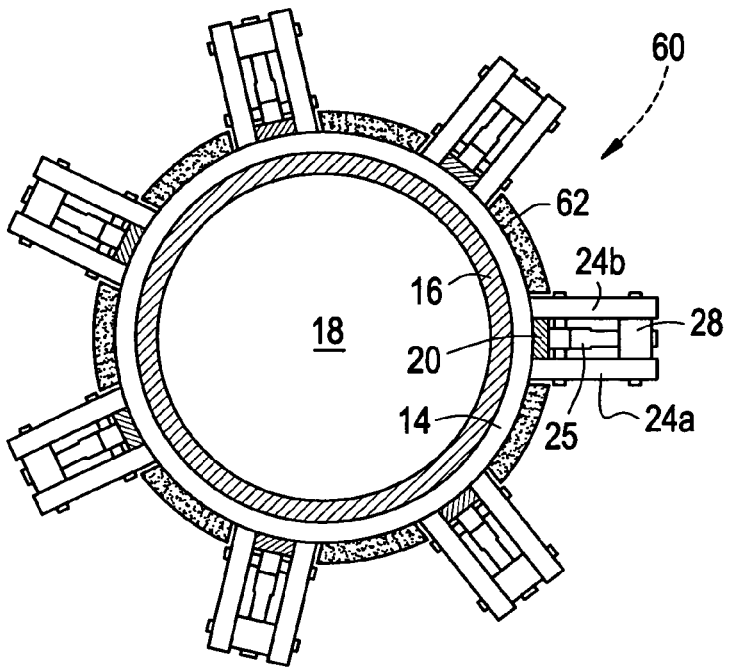

In addition to the above, in some embodiments, a skirt may be mounted around the circumference of the bottom flange 14 of the coke drum 10. This may be seen in FIGS. 8-9, the where a skirt 60 is attached around the bottom flange 14. As can be seen, the skirt 60 is made of a plurality of skirt segments 62 attached to the bottom flange 14 in between the clamps 12. Each skirt segments 62 extends radially outward from the bottom flange 14, then downward below the top of the bottom head cover 18 to form an upside-down L. Other shapes may certainly be used for the skirt segments 62 without departing from the scope of the invention. The skirt segments 62 help deflect escaping coke, gas or liquids downward and away from the workers in the event of local gasket leakage. The result is a significant risk reduction to the workers as they are loosening the bolts of the bottom head cover 18.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of clamping a bottom head cover of a coke drum to a bottom flange of said coke drum, comprising:
    determining a minimum number of clamps needed to maintain an effective seal between said bottom head cover and said bottom flange of said coke drum;
    mounting at least said minimum number of clamps around a periphery of said bottom flange to secure said clamps to said coke drum;
    and actuating said mounted clamps using a control unit from a remote location to clamp said bottom head cover to said bottom flange
    wherein said multiple individual clamps are spaced apart by no more than a maximum distance determined based on one or more of a diameter and geometry of said bottom flange, a stiffness of said bottom flange, a resiliency and response under varying load of a gasket disposed between said bottom flange and said bottom head cover, and a pressure exerted on said bottom head cover from liquid inside said coke drum.

2. The method according to claim 1, wherein said step of determining said minimum number of clamps is based on one or more criteria, including a diameter and geometry of said bottom flange, a stiffness of said bottom flange, a resiliency and response under varying load of a gasket disposed between said bottom flange and said bottom head cover, and a pressure exerted on said bottom head cover from a content of said coke drum.

3. The method according to claim 2, wherein said step of determining said minimum number of clamps is performed iteratively and using finite element analysis.

4. The method according to claim 1, wherein said step of determining said minimum number of clamps is performed by trial and error.

5. The method according to claim 1, wherein said step of mounting at least said minimum number of clamps is performed by permanently attaching said clamps to said bottom flange.

6. The method according to claim 1, wherein said clamps are configured to clamp said bottom head cover to said bottom flange and are positionable in a manner such that said clamps do not extend underneath said bottom head cover.

7. The method according to claim 1, wherein said clamps are configured to provide an adjustable amount of clamping force.

8. The method according to claim 1, wherein said step of mounting at least said minimum number of clamps is performed by releasably attaching said clamps to said bottom flange.

9. The method according to claim 8, wherein said step of releasably attaching at least said minimum number of clamps is performed using a split ring.

10. The method according to claim 1, further comprising deflecting any escaping liquids or steam downward by attaching a protective skirt around a periphery of said bottom flange.

11. A clamping system for clamping a bottom head cover of a coke drum to a bottom flange of said coke drum, comprising:
- at least the minimum number of clamps attached to said bottom flange needed to maintain an effective seal between said bottom head cover and said bottom flange of said coke drum; and
- a control unit for remotely actuating said attached clamps at approximately the same time to apply approximately the same amount of clamping force;
- wherein said multiple individual clamps are spaced apart by no more than a maximum distance determined based on one or more of a diameter and geometry of said bottom flange, a stiffness of said bottom flange, a resiliency and response under varying load of a gasket disposed between said bottom flange and said bottom head cover, and a pressure exerted on said bottom head cover from liquid inside said coke drum.

12. The system according to claim 11, further comprising a plurality of lugs extending from an outer circumferential surface of said bottom head cover, each clamp configured and positioned to engage a respective lug to clamp said bottom head cover to said bottom flange.

13. The system according to claim 12, wherein said clamps are configured and positionable to engage said lugs in a manner such that said clamps do not extend underneath said bottom head cover.

14. The system according to claim 12, wherein said lugs are permanently attached to said bottom head cover.

15. The system according to claim 12, wherein said lugs are formed as an integral part of said bottom head cover.

16. The system according to claim 11, wherein said clamps are spaced substantially evenly around said periphery of said bottom flange.

17. The system according to claim 11, wherein said clamps are spaced unevenly around said periphery of said bottom flange.

18. The system according to claim 11, further comprising a skirt mounted around a periphery of said bottom flange for deflecting escaping coke, gas or liquids downward.

19. The system according to claim 18, wherein said skirt comprises a plurality of skirt segments, each skirt segment mounted to said bottom flange between two clamps.

20. An apparatus for clamping a bottom head cover of a coke drum to a bottom flange of said coke drum, comprising:
- a minimum number of multiple individual clamps needed to maintain an effective seal between a coke drum and a bottom flange of said coke drum said clamps comprising:
    - a first clamp member having a distal end and a proximal end, said proximal end of said first clamp member configured to be anchored to said bottom flange;
    - a second clamp member having a distal end and a proximal end, said proximal end of said second clamp member capable of engaging a lug extending from an outer circumference of said bottom head cover, said first and second clamp members pivotably connected at a point between their respective distal ends and proximal ends; and
    - a clamping mechanism configured to apply a force to said distal ends of said first and second clamp members to cause said proximal end of said second clamp member to engage said lugs; and
- a control unit for remotely actuating said attached multiple individual clamps at approximately the same time to apply approximately the same amount of clamping force.

21. The apparatus according to claim 20, wherein said clamping mechanism is further configured to apply an adjustable amount of force to said distal ends of said first and second clamp members.

22. The apparatus according to claim 21, wherein said clamping mechanism includes a bore cylinder, a rod disposed within said bore cylinder, and a hinge connected to one end of said rod, said hinge hingedly connected to said distal end of said second clamp member.

23. The apparatus according to claim 20, wherein said distal end of said second clamp member is configured to engage said lug in a manner such that said second clamp member does not extend underneath said bottom head cover.

24. The apparatus according to claim 20, wherein said distal end of said second clamp member is configured to engage said lug in a manner such that said second clamp member does not extend below said bottom head cover.

25. The apparatus according to claim 20, wherein said distal end of said first clamp member is anchored to said bottom flange on an outer circumferential surface of said bottom flange.

26. The apparatus according to claim 20, wherein said first clamp member comprises two adjacent arms, each arm having a distal end and a proximal end and wherein said two adjacent arms of said first clamp member are pivotably connected at a point between their respective distal ends and proximal ends to said second clamp member, said proximal ends of said adjacent arms configured to be anchored to said bottom flange.

27. The apparatus according to claim 20, wherein said first clamp member is permanently attached to said bottom flange.

28. The apparatus according to claim 20, wherein said first clamp member is releasably attached to said bottom flange.

* * * * *